United States Patent Office 3,518,095
Patented June 30, 1970

3,518,095
DRY FONDANT AND METHOD OF MAKING THE SAME
Fred H. Harding, Port Washington, Reuben Horowitz, Flushing, and Anthony Monti, Brooklyn, N.Y., assignors to Su Crest Corporation, New York, N.Y., a corporation of New York
No Drawing. Filed Nov. 3, 1964, Ser. No. 408,676
Int. Cl. A23g 3/00
U.S. Cl. 99—141                                    19 Claims

ABSTRACT OF THE DISCLOSURE

Pulverized sugar, such as sucrose, is sprayed with an aqueous solution of an ingestibly-acceptable organic binding agent, preferably a carbohydrate such as invert sugar, and the resulting mixture is mixed for a period of time sufficient to form agglomerates having sizes in the range of 14 to 80 mesh. The agglomerates are rolled to impart a generally spherical shape thereto and to firm them and dried to a moisture content of less than about 3 percent. The resulting product comprises pulverized sugar in a matrix of the binder, and can be used to prepare a creamy fondant.

---

This invention relates to a new and improved fondant and methods for making such fondant, and more particularly, to a new and improved dry fondant, and methods for making same.

In the confectionery industry, the term "fondant" is understood to be the generic designation for a mixture of sugar and sugar syrup ranging in its visible, physical state from a substantially dry, granular mass to a creamy consistency. The latter are generally used directly as the centers for chocolate creams and the like, for icings, for fudges, and for other similar confections. Between the dry, granular fondants and those which are creamy in nature, are the soft, doughy, or paste-like products. Except for the creamy types, the other forms of fondants are used as a base material from which to prepare the final, and consumer-usable fondant product, The latter, as pointed out above, may be an icing, a fudge, a cream center for a chocolate candy or the like.

The dry and the pasty fondants which form the fondant bases or stock fondants are conventionally formulated with coloring materials, where desired or necessary, with flavoring compounds and with other additives depending upon the nature of the ultimate product to be produced. Where pasty fondant stocks are employed, the incorporation of the above described materials is carried out by a carefully controlled heating of the stock followed by a uniform admixing of the said additive materials therein. Since the pasty fondant stocks normally contain about 11 to 12% water, the further addition of water to prepare the final formulated fondant is ordinarily not necessary or indicated, although this can be done where it is necessary. It has been found, however, and it is well known that the use of such pasty fondant stocks is attendant with many deficiencies and difficulties. First, it must be prepared according to a most exacting procedure in order to obtain a satisfactory and uniform product. The process is lengthy, requires considerable and expensive equipment and entails the use of an inordinate number of man-hours. After the preparation of the fondant paste, it is necessary to keep it cool, if it is not used almost immediately. Storage in sealed containers may be resorted to for future use but the keeping qualities are poor. This lack of keeping quality coupled with the need for cool storage is the second failing of the paste-type fondant.

Many processes have been developed for the production of a dry fondant stock not only as an alleged improvement over the paste types but as a supplementary and alternate precursor for the creamy fondants and the finally formulated consumer confections. The obvious advantages of a dry fondant stock are lower packaging and freight costs, easier handling and dispensing, and greater adaptability to automatic operations. Other advantages urged for prior developed dry fondants are simple process of preparation, lower equipment costs, generally lower overall costs, a superior and more uniform creamy or liquid fondant obtainable from the dry stock, and better keeping qualities among others.

Suffice it to say, notwithstanding these alleged improvements, it has been found that the processes heretofore suggested for preparing dry, stock fondants not only require elaborate and expensive equipment but most importantly they do not produce a dry fondant which meets the desideratums above, particularly with respect to the uniformity and quality of the reconstituted liquid confections.

It is therefore an object of this invention to provide a new and improved process for producing a dry fondant.

It is another object of this invention to provide a new and improved process for producing a dry fondant which can be readily converted or reconstituted to a creamy consistency of uniform and high quality.

It is still another object of the present invention to provide a new and improved process for producing a dry fondant in granular form which is non-caking, free-flowing and readily and rapidly reconstitutable to a high quality, creamy fondant.

It is a further object of this invention to provide a simple and efficacious process for producing an outstanding, dry fondant which is adaptable for automated operation in the confectionary and allied industries.

It is still another further object of this invention to provide a new and improved process which is economically advantageous vis-a-vis other processes for dry fondant manufacture.

It is still a further object of the present invention to provide a new and outstanding dry fondant preparation.

It is another object of the present invention to provide an outstanding dry fondant which is simple and economical to manufacture, and which reconstitutes to a high quality creamy fondant.

Other objects will appear hereinafter as the description proceeds.

The process of the present invention involves the following critical features:

(1) The admixture of a critical particle size sugar (sucrose) with a fine spray of liquid syrup;

(2) Agitation of the mixture formed in (1) to produce clusters or agglomerates of specified and relatively uniform particle size; and (3) Drying of the agglomerates produced in (2) to a moisture content of less than about 3%.

While it has heretofore been suggested that a dry fondant product may be produced by spraying a liquid, invert sugar solution into a mass of finely divided sucrose, and mixing the resultant admixture, it has been clearly stated that mixing is continued until the liquid appears to have been completely absorbed and the mixture is little changed from the original powdered sugar. Mixing beyond this point is specifically stated to be avoided. In the fondant produced thereby, there may be present as much as 6% water. This high water content leads to poor keeping characteristics of the fondant, causes caking thereof, and the icings produced therefrom lack the desirable luster or sheen of the freshly prepared boiled fondants.

The process of the present invention produces a dry fondant which is relatively inexpensive, easily packaged, readily and more cheaply transported, reconstitutes readily and quickly to excellent creamy fondant products such as icings, chocolate candy centers, and the like, stores well, handles excellently, and generally meets all of the requisites of the ideal stock fondant.

In addition to the three critical procedural manipulations described above, it has been found that in order to achieve the ends and objects to which the present invention is directed, certain other conditions must be met. These include the water content of the liquid syrup spray, and the relative proportions of the sugar and the syrup. These will be more fully discussed below.

The general process of this invention involves the provision of a suitable particle size sugar and a selected carbohydrate syrup which are admixed by spraying the latter into a mass of the sugar. The mixture is agitated in any suitable mixing device whereby agglomerates are produced. The mixing or agitation is continued until the largest clusters are about the size to pass through a 14 mesh Tyler screen or equivalent. Some larger clusters may be formed but these can be rubbed through the screen or an auxiliary one and added to the main batch. The agglomerates or clusters are then dried in any convenient manner but with care not to exceed a temperature of approximately 140° F. in the product to a water content of less than about 3% and in most instances preferably below about 1.5%. The dried fondant agglomerates finer than 80 mesh are removed by screening or other clarification method to yield a final pulverulent fondant with agglomerate particles ranging from 14 mesh to 80 mesh (Tyler).

The particle size of the sugar (sucrose) is very critical in order to achieve the outstanding and unusual characteristics of the dry fondant of this invention. It has been found that the average particle size should be about 15 microns with substantially none above about 40 microns, but at most no more than about 1% of the sugar should exceed this upper limit of the particle size of the pulverized sucrose. Further, no less than about 50% of the pulverized product should have a particle size less than about 25 microns. The particle sizes and their distribution which are herein referred to are weight averages and weight percentages.

The liquid syrup used for spray application to the pulverized sugar may be any of the syrups presently available for fondant preparation and include, particularly, the following:

Sucrose
Invert sugar
Sorbitol
Glycerol
Dextrose
Levulose
Lactose
Dextrin
Corn syrup
Blends of two or more of the above
Molasses
Refiner's syrup
Honey
Maple syrup
Cane sugar syrup, and the like.

In addition to the carbohydrate materials set forth above as suitable binding agents, it is clear that any organic binding material which is ingestibly acceptable can be used, although those which are specifically recited are the preferred binding agents. Additives such as sodium and calcium saccharine, and sodium and calcium cyclamate may also be present.

The amount of binding agent in the aqueous, noncrystallizable solution must not be less than about 50%, by weight, based on the weight of the solution, and should not exceed about 80%, by weight, also based on the weight of the solution. The most preferred range of binding agent is from about 70% to about 75%, by weight, based on the weight of the solution.

In order to obtain the necessary and critical agglomerate size and the admirable properties thereof outlined above, the amount of the binding agent must be controlled to within certain critical concentration limits. These limits are from about 0.1 part to about 30 parts of binding agent for each 100 parts of the pulverized sugar. The exact and selected amount will be determined by the particular nature of the ultimate reconstituted creamy fondant to be desired.

The temperature of the binder solution during the spraying operation is not particularly critical, but it should not be below about room temperature, i.e. 50° F., since the viscosity will generally be too high for convenient handling and spraying purposes. Also, such temperature should not be above about 200° F., i.e. it should be below the boiling point of water, since too much water may be lost in the spraying step, and subsequent agglomeration to the necessary particle sizes and particle strength will not result.

The formation of the fondant agglomerates during and after the spraying step may be carried out in any conventional or suitable mixer or blender, and this may be conducted batchwise or in a continuous manner. An example of a suitable apparatus is a Patterson-Kelly liquids-solids blender. The mixer is operated with sufficient agitation provided to the pulverized sugar and the binder spray to effect a uniform intermingling or distribution thereof, but not so violent as to prevent the formation of the clusters or agglomerates.

After the agglomerates have been formed, it may be desirable to subject them to a tumbling or rolling step so as to impart a general spherical shape thereto. This action also tends to firm the agglomerates so that a minimum thereof will be broken in subsequent operations, such as screening, drying, packing, shipping, and reconstituting.

The next step in the process for producing the dry fondant stock is to dry same to the critical moisture level, and this, too, can be done in any of the conventional types of drying equipment. Examples of the latter are vibrating screen drier, rotary drier, tray drier, fluidized bed drier, tunnel drier, belt drier, and pan drier.

Heated air, preferably below 190 F. is utilized in the drying operation, and the product is maintained below about 140° F.

Following the drying phase of the operation, the agglomerates are further screened on an 80 mesh screen to remove any that are oversize and undersize from the product following 80 mesh screening. These can be recycled for further use.

The following examples will serve to illustrate the present invention without being deemed limitative thereof. Parts are by weight unless otherwise indicated.

EXAMPLE 1

To 90 parts of pulverized sugar having an average particle size of 15 microns, less than 1% thereof exceeding 40 microns, and more than 50% thereof less than 25 microns in size, the said pulverized sugar being in a Patterson-Kelly liquids-solids blender, there is rapidly added by spraying at room temperature (65° F.), and while agitating the pulverized sugar, about 14 parts of an aqueous invert sugar solution (72 Brix). A small amount of monocalcium phosphate is added to adjust the pH to 4.5–4.8 to prevent discoloration. After the addition of the invert syrup has been completed the blender is run for about 2 minutes to complete the agglomeration. The total time of operation, i.e. spraying and agglomeration, is about 6 minutes.

The resultant agglomerated material, which contains about 3.5% water, is then screened through a vibrating 20 mesh screen. The agglomerates coarser than 20 mesh are still relatively soft and can be rubbed through an auxiliary screen and added to the first product. The screened material is then placed in a rotary drier and warm air at about 180° F. is circulated through the drier to dry the agglomerates to a water content of 1%. The drier is operated so that the temperature of the agglomerates does not rise above 140° F. The dried fondant is then further screened on an 80 mesh screen. The material remaining on the screen is the finished product. That passing through the screen may be returned to the blender for reprocessing.

The fondant product is free-flowing and may be readily packaged by conventional equipment. The product reconstitutes in half the time it takes other dry fondant stocks, and makes an excellent bakers' fondant.

EXAMPLE 2

The general procedure of Example 1 is repeated except that 6.5 parts of pulverized sugar are employed for each part of syrup, and the syrup used comprises 9.4% invert syrup, 79.4% sucrose syrup, and 11.2% granulated sugar. The syrup is used at 70.4% solids and is added slowly in the form of a very fine mist at a temperature of 100° F. to the agitated pulverized sugar. Screening, drying and final screening are carried out as in the previous example, except that the water content of the agglomerates is reduced to 0.5%. The fondant stock so produced forms an excellent confectionery fondant. Thus, by adding egg white, invertase and water thereto, cream centers may be produced which are firm, can be rolled by hand or extruded by machine, and can be readily coated.

EXAMPLE 3

The general procedure of Example 1 is once again repeated using a charge of 160 pounds of the pulverized sugar. The binder is 22.5 pounds of a 72 Brix fully inverted syrup. The latter is sprayed into the sugar over a 5 minute period. The blender is continued in operation for one additional minute to complete the agglomeration. The product which ensues contains about 92% sucrose, 8% invert sugar and 3% moisture. It is dried at an air temperature of 180° F. to a moisture content of 0.25%. After final screening, there is obtained 90% of acceptable and useable product of the same excellent properties of the previous examples.

EXAMPLE 4

Example 1 is repeated, employing, in separate procedures, the indicated concentrations of invert syrup in place of the 72 Brix syrup of that example:

(A) 50 Brix
(B) 60 Brix
(C) 70 Brix
(D) 80 Brix

The results are comparable to that of Example 1.

EXAMPLE 5

Examples 1 and 4 are repeated, using, however, the following indicated temperatures for the sprayed syrup:

(A) 75° F.
(B) 90° F.
(C) 120° F.
(D) 150° F.

Excellent results are obtained in each instance.

EXAMPLE 6

The procedure of Example 3 is repeated, employing the following percentages of pulverized sucrose and invert sugar:

(A) 95% sucrose—5% invert sugar.
(B) 85% sucrose—15% invert sugar
(C) 75% sucrose—25% invert sugar.
(D) 99.5% sucrose—0.5% invert sugar.

EXAMPLE 7

The procedure of Example 2 is repeated, using the percentages of Example 6, A, B, C and D (i.e. pulverized sugar on the one hand and binder on the other hand).

Having thus described the invention in such full, clear, concise and exact terms as to enable others skilled in the art to make use of and practice the same, what is claimed and desired to be secured by Letters Patent is:

1. A method for preparing a dry fondant in a free-flowing, granular state and which is characterized by reconstitutability to a high quality creamy fondant which comprises:
  (a) spraying an aqueous carbohydrate solution containing at least about 50% solids to about 80% solids onto pulverized sugar having an average particle size of about 15 microns, less than about 1% thereof having a particle size in excess of about 40 microns, and more than about 50% thereof having a particle size under about 25 microns,
  (b) agitating the mixture so produced under conditions sufficient to effect uniform intermingling and distribution of said sugar and solution and continuing agitation for a period of time sufficient to form agglomerates of a size to pass through a vibrating 14 mesh screen and be retained on a vibrating 80 mesh screen,
  (c) rolling said agglomerates to impart a general spherical shape thereto and to firm said agglomerates, and thereafter,
  (d) drying the resultant agglomerates to a water content of less than about 3%, and the said agglomerates containing from about 0.1 parts to about 30 parts by weight of carbohydrate solids for each 100 parts of the said pulverized sugar.

2. A method for preparing a dry fondant in a free-flowing, granular state and which is characterized by reconstitutability to a high quality creamy fondant which comprises:
  (a) spraying an aqueous solution of a carbohydrate containing from at least about 50% solids, by weight, to about 80% solids, by weight, onto a mass of pulverized sugar having an average particle size of about 15 microns with less than about 1% thereof, by weight, having a particle size in excess of about 40 microns, and more than at least about 50% thereof, by weight, having a particle size less than about 25 microns.
  (b) agitating the mixture so produced under conditions sufficient to effect uniform intermingling and distribution of said sugar and solution and continuing agitation for a period of time sufficient to form agglomerates thereof, of a size to pass through a 20 mesh screen and retainable on an 80 mesh screen,
  (c) rolling said agglomerates to impart a general spherical shape thereto and to firm said agglomerates, and thereafter
  (d) drying the said agglomerates to a water content of less than about 3%, the said agglomerated product containing from about 0.1 part to about 30 parts, by weight, of the said carbohydrate solids for each 100 parts, by weight, of the said pulverized sugar.

3. A method for preparing a free-flowing, dry sugar composition in a granular state which comprises:
  (a) spraying an aqueous solution of an ingestibly acceptable organic binding agent containing at least about 50%, by weight, to about 80%, by weight, solids into an agitated mass of pulverized sugar having an average particle size of about 15 microns with less than about 1% thereof, by weight, having a particle size in excess of about 40 microns, and more than at least about 50% thereof, by weight, having a particle size less than about 25 microns, said agitation being sufficient to effect uniform intermingling and distribution of said sugar and solution,
  (b) continuing the agitation of the mixture of pulverized sugar and solution until agglomerates thereof are formed, said agglomerates of a size to pass through a 20 mesh screen and retainable on an 80 mesh screen (c) rolling said agglomerates to impart a general spherical shape thereto and to firm said agglomerates, and thereafter (d) drying the said agglomerates to a water content of less than about 3%, the said agglomerated product containing from about 0.1 part to about 30 parts, by weight, of the said solids for each 100 parts, by weight, of the said pulverized sugar.

4. A method for preparing a free-flowing, dry sugar composition in a granular state which comprises:

(a) spraying an aqueous carbohydrate solution containing from at least about 50%, by weight, to about 80%, by weight, of solids into an agitated mass of pulverized sucrose having an average particle size of about 15 microns with less than about 1% thereof, by weight, having a particle size in excess of about 40 microns, and more than at least about 50% thereof, by weight, having a particle size of less than about 25 microns, said agitation being sufficient to effect uniform intermingling and distribution of said sugar and solution, (b) continuing the agitation of the mixture of pulverized sucrose and aqueous solution after cessation of the spraying until agglomerates are formed, said agglomerates of a size to pass through a 20 mesh screen and retainable on an 80 mesh screen, (c) rolling said agglomerates to impart a general spherical shape thereto and to firm said agglomerates, and thereafter (d) drying the said agglomerates to a water content of less than about 3%, the said agglomerated product containing from about 0.1 part to about 30 parts, by weight, of the said carbohydrate solids for each 100 parts, by weight, of the said pulverized sucrose.

5. A method for preparing a free-flowing, dry sugar composition in a granular state which comprises:

(a) uniformly admixing a spray of an aqueous carbohydrate solution containing from at least about 50%, by weight, to about 80%, by weight, solids with pulverized sucrose having an average particle size of about 15 microns with less than about 1% thereof, by weight, having a particle size in excess of about 40 microns, and more than at least about 50% thereof, by weight, having a particle size of less than about 25 microns, under conditions sufficient to effect uniform intermingling and distribution of said sucrose and solution, (b) forming agglomerates of said pulverized sucrose and spray, said agglomerates of a size to pass through a 20 mesh screen and retainable on an 80 mesh screen, (c) rolling said agglomerates to impart a general spherical shape thereto and to firm said agglomerates, and thereafter (d) drying the said agglomerates to a water content of less than about 3%, the resultant agglomerated product containing from about 0.1 part to about 30 parts, by weight, of the said carbohydrate for each 100 parts, by weight, of the said pulverized sucrose.

6. A method for preparing a dry fondant in a free-flowing, granular state and which is characterized by reconstitutability to a high quality creamy fondant which comprises:

(a) uniformly admixing
 (1) a spray of an aqueous solution containing from at least about 50%, by weight, to about 80%, by weight, of an ingestibly acceptable organic binding agent with
 (2) pulverized sugar having an average particle size of about 15 microns with less than about 1% thereof, by weight, having a particle size in excess of about 40 microns, and more than at least about 50% thereof, by weight, having a particle size of less than 25 microns, under conditions sufficient to effect uniform intermingling and distribution of said sucrose and solution, (b) forming firm generally spherical agglomerates of the mixture of said pulverized sugar and said organic binding agent solution of a size to pass through a 40 mesh screen, (c) drying the said agglomerates to a water content of less than about 3%, and thereafter (d) screening said dried agglomerates to retain those not passing through an 80 mesh screen, the said retained, dried agglomerates containing from about 0.1 part to about 30 parts, by weight, of the said organic binding agent for each 100 parts, by weight, of the said pulverized sugar.

7. A method for preparing a dry fondant in a free-flowing, granular state and which is characterized by reconstitutability to a high quality creamy fondant which comprises:

(a) uniformly admixing
 (1) a spray of an aqueous solution containing from at least about 50%, by weight, to about 80%, by weight, of an ingestibly acceptable organic binding agent with
 (2) pulverized sugar having an average particle size of about 15 microns, with less than about 1% thereof, by weight, having a particle size in excess of about 40 microns, and more than about at least 50% thereof, by weight, having a particle size of less than about 25 microns, under conditions sufficient to effect uniform intermingling and distribution of said sucrose and solution, (b) forming firm generally spherical agglomerates of the mixture of said pulverized sugar and said organic binding agent solution by agitation of the mixture thereof to a size which will pass through a 20 mesh screen, (c) drying the said agglomerates to a water content of less than about 3% and thereafter (d) retaining from said dried agglomerates those which are retainable on an 80 mesh screen, the said retained and dried agglomerates containing from about 0.1 part to about 30 parts, by weight, of the said organic binding agent for each 100 parts, by weight, of the said pulverized sugar.

8. A method for preparing a dry fondant in a free-flowing granular state and which is characterized by reconstitutability to a high quality creamy fondant which comprises:

(a) agitating a mixture of
 (1) a uniformly distributed spray of an aqueous solution containing from at least about 50%, by weight, to about 80%, by weight, of a carbohydrate with
 (2) pulverized sugar having an average particle size of about 15 microns, with less than 1% thereof, by weight, having a particle size in excess of about 40 microns, and more than at least about 50% thereof, by weight, having a particle size of less than about 25 microns, under conditions sufficient to effect uniform intermingling and distribution of said sucrose and solution, (b) forming firm generally spherical agglomerates of the mixture of said pulverized sugar and said carbohydrate solution by agitation of the said mixture, the said agitation being continued until the agglomerate size is about that which will just pass through a 20 mesh screen, (c) drying the said agglomerates to a water content of less than about 3%, and thereafter (d) retaining from said dried agglomerates those which are retainable on an 80 mesh screen, the said retained and dried agglomerates containing from about 0.1 part to about 30 parts, by weight, of the said carbohydrate for each 100 parts, by weight, of the said pulverized sugar.

9. A method for preparing a dry fondant in a free-flowing granular state and which is characterized by reconstitutability to a high quality creamy fondant which comprises:
  (a) agitating a mixture of
    (1) a uniformly distributed spray of an aqueous solution containing from at least about 50%, by weight, to about 80%, by weight, of a carbohydrate with
    (2) pulverized sucrose having an average particle size of about 15 microns, with less than about 1% thereof, by weight, having a particle size in excess of about 40 microns, and more than about at least 50% thereof, by weight, having a particle size of less than about 25 microns, under conditions sufficient to effect uniform intermingling and distribution of said sucrose and solution,
  (b) forming firm generally spherical agglomerates of the mixture of said pulverized sucrose and said carbohydrate by agitation of the said mixture, the said agitation being continued until the agglomerate size is about that which will just pass through a 20 mesh screen,
  (c) drying the said agglomerates to a water content of less than about 3%, and thereafter,
  (d) retaining from said dried agglomerates those which are retainable on an 80 mesh screen, the said retained and dried agglomerates containing from about 0.1 part to about 30 parts, by weight, of the said carbohydrate for each 100 parts, by weight, of the said pulverized sucrose.

10. A method for preparing a dry fondant in a free-flowing granular state and which is characterized by reconstitutability to a high quality creamy fondant which comprises:
  (a) agitating a mixture of
    (1) a uniformly distributed spray of an aqueous solution containing from at least about 50%, by weight, to about 80%, by weight, of a carbohydrate with
    (2) pulverized sucrose having an average particle size of about 15 microns, with less than about 1% thereof, by weight, having a particle size in excess of about 40 microns, and more than about at least 50% thereof, by weight, having a particle size of less than about 25 microns, under conditions sufficient to effect uniform intermingling and distribution of said sucrose and solution,
  (b) forming firm generally spherical agglomerates of the mixture of said pulverized sucrose and said carbohydrate by agitation of the said mixture, the said agitation being continued until the agglomerate size is about that which will just pass through a 20 mesh screen,
  (c) drying the said agglomerates at a temperature below about 140° F. in the product to a water content of less than about 3%, and thereafter,
  (d) retaining from said dried agglomerates those which are retainable on an 80 mesh screen, the said retained and dried agglomerates containing from about 0.1 part to about 30 parts, by weight, of the said carbohydrate for each 100 parts, by weight, of the said pulverized sucrose.

11. A method for preparing a dry fondant in a free-flowing, granular state and which is characterized by reconstitutability to a high quality creamy fondant which comprises:
  (a) agitating a mixture of
    (1) a uniformly distributed spray of an aqueous solution containing from at least about 50%, by weight, to about 80%, by weight, of a carbohydrate with
    (2) pulverized sucrose having an average particle size of about 15 microns, with less than about 1% thereof, by weight, having a particle size in excess of about 40 microns, and more than about at least 50% thereof, by weight, having a particle size of less than about 25 microns, said agitation being sufficient to effect uniform intermingling and distribution of said sugar and solution,
  (b) forming firm generally spherical agglomerates of the mixture of said pulverized sucrose and said carbohydrate solution by agitation of the said mixture, the said agitation being continued until the agglomerate size is about that which will just pass through a 20 mesh screen,
  (c) drying the said agglomerates at a temperature below about 140° F. in the product utilizing heated air at a temperature below about 140° F. in the product utilizing heated air at a temperature below about 190° F. to a water content of less than about 3%, and thereafter
  (d) retaining from said dried agglomerates those which are retainable on an 80 mesh screen, the said retained and dried agglomerates containing from about 0.1 part to about 30 parts, by weight, of the said carbohydrate for each 100 parts, by weight, of the said pulverized sucrose.

12. A method as defined in claim 8 wherein the carbohydrate is invert sugar.

13. A method as defined in claim 12 wherein the agglomerates are dried to a water content of from about 0.25% to about 1%, by weight.

14. A method as defined in claim 8 wherein the aqueous solution of carbohydrate contains about 72% of the said carbohydrate, by weight, based on the weight of the solution.

15. A method as defined in claim 13 wherein the aqueous solution of invert sugar contains from about 70% to about 75%, by weight, of the said invert sugar based on the weight of the solution.

16. A method as defined in claim 15 wherein the agglomerates are air dried employing heated air at a temperature not exceeding about 190° F., and the temperature of the product during drying does not exceed about 140° F.

17. A free-flowing, granular dry fondant consisting essentially of firm generally spherical agglomerates of uniformly intermingled pulverized sugar and an aqueous non-crystallizable carbohydrate solution containing from at least 50%, by weight, to about 80%, by weight, of carbohydrate as a binder for said agglomerates; said agglomerates being characterized by the following properties:
  (a) average particle size of the pulverized sugar is 15 microns, less than 1% thereof having a particle size in excess of about 40 microns, and more than 50% thereof having a particle size of less than about 25 microns,
  (b) agglomerate size ranging from 14 mesh to about 80 mesh,
  (c) water content less than about 3%,
  (d) about 0.1 to about 30 parts, by weight, of carbohydrate for each 100 parts, by weight, of pulverized sugar; the said granular fondant further characterized by reconstitutability to a high quality creamy fondant.

18. A composition according to claim 17 wherein said sugar is sucrose.

19. A free-flowing, granular dry fondant consisting essentially of firm generally spherical agglomerates produced from a uniformly intermingled mixture of:
  (1) pulverized sugar having an average particle size of 15 microns, less than 1% thereof having a particle size in excess of about 40 microns, and more than 50% thereof having a particle size of less than about 25 microns, and (2) an invert syrup containing from at least 50%, by weight, to about 80%, by weight, of solids as a binder for said agglomerates being characterized by the following properties:
  (a) agglomerate size ranging from 14 mesh to about 80 mesh;
  (b) water content less than about 3%; and
  (c) about 0.1 to about 30 parts, by weight, of invert syrup solids for each 100 parts, by weight, of pulverized sugar.

References Cited

UNITED STATES PATENTS

| | | | |
|---|---|---|---|
| 2,299,287 | 10/1942 | Whymper | 99—134 X |
| 2,824,808 | 2/1958 | Gillett et al. | 99—134 |
| 3,006,763 | 10/1961 | Marcy et al. | 99—26 |
| 3,143,428 | 8/1964 | Reimers et al. | 99—141 |
| 1,239,221 | 9/1917 | Rodman | 23—313 X |
| 3,116,150 | 12/1963 | Baker | 99—94 |
| 3,391,003 | 7/1968 | Armstrong et al. | 99—56 |
| 3,248,226 | 4/1966 | Stewart | 99—26 |

FOREIGN PATENTS 909,082  10/1962  Great Britain.

MAURICE W. GREENSTEIN, Primary Examiner

U.S. Cl. X.R.

99—134; 127—30